(12) United States Patent
Miller et al.

(10) Patent No.: US 10,021,237 B1
(45) Date of Patent: Jul. 10, 2018

(54) ISOLATING CONNECTOR MODULE FOR RUGGEDIZED MOBILE DEVICE

(71) Applicant: MobileDemand LC, Hiawatha, IA (US)

(72) Inventors: Matthew Miller, Cedar Rapids, IA (US); Steven R. Kunert, Cedar Rapids, IA (US)

(73) Assignee: MobileDemand LC, Hiawatha, IA (US)

( * ) Notice: Subject to any disclaimer, the term of this patent is extended or adjusted under 35 U.S.C. 154(b) by 11 days.

(21) Appl. No.: 15/422,239

(22) Filed: Feb. 1, 2017

Related U.S. Application Data

(60) Provisional application No. 62/289,822, filed on Feb. 1, 2016.

(51) Int. Cl.
| | | |
|---|---|---|
| *H04W 24/00* | (2009.01) | |
| *H04M 1/725* | (2006.01) | |
| *H04B 1/3888* | (2015.01) | |
| *H04B 1/3877* | (2015.01) | |

(52) U.S. Cl.
CPC ........ *H04M 1/7253* (2013.01); *H04B 1/3877* (2013.01); *H04B 1/3888* (2013.01); *H04M 2250/02* (2013.01)

(58) Field of Classification Search
CPC .......... H04B 1/3888; H04B 2001/3894; A45C 2011/002; A45C 11/00; A45C 2011/003; A45C 2011/001; A45C 11/321; A45C 13/008; A45C 13/02; A45C 2013/1015; A45F 2200/0516; A45F 5/02; A45F 2005/026; A45F 5/00; A45F 2003/142; A45F 2003/146; A45F 2005/006; A45F 2005/008; A45F 2005/025; A45F 2200/0525; H04M 1/185; H04M 1/04; H04M 1/0254; H04M 1/0283; H04M 1/21; H04M 1/72527; H04M 1/0202; H04M 1/0249; H04M 1/0266; H04M 1/0274; H04M 1/03; H04M 1/035; H04M 1/18; H04M 1/72533; H04M 1/72575; H04M 2250/02

See application file for complete search history.

(56) References Cited

U.S. PATENT DOCUMENTS

| | | | |
|---|---|---|---|
| 7,249,978 B1 * | 7/2007 | Ni ........................... | G06K 19/07 361/752 |
| 2014/0152890 A1 * | 6/2014 | Rayner ................. | G06F 1/1626 348/376 |
| 2015/0201723 A1 * | 7/2015 | Rayner ................. | G06F 1/1601 224/191 |

* cited by examiner

*Primary Examiner* — Golam Sorowar
(74) *Attorney, Agent, or Firm* — Suiter Swantz pc llo

(57) ABSTRACT

An apparatus for connecting a mobile device to a vehicle-based network includes a USB or similar accessory connector enclosed in a protective housing. The connector housing may include a Bluetooth or similar wireless connector for establishing a wireless link between the mobile device and the vehicle-based network via the USB port. The connector housing may include a hinged panel allowing access to the USB connector while open, and securing the USB connector to a USB port of the mobile device while closed. The connector housing may include a flexible impact absorber for isolating the connector from shocks or vibrations conducted by the vehicle mount by which the mobile device is mounted to a dashboard or interior surface of the vehicle.

14 Claims, 5 Drawing Sheets

ISOLATING CONNECTOR MODULE FOR RUGGEDIZED MOBILE DEVICE

CROSS-REFERENCE TO RELATED APPLICATIONS

The instant application claims priority under 35 U.S.C. § 119(e) to provisional U.S. patent application Ser. No. 62/289,822, filed on Feb. 1, 2016. Said provisional U.S. patent application Ser. No. 62/289,822 is herein incorporated by reference in its entirety.

BACKGROUND

Mobile communications devices, such as tablets or smartphones, may be mounted to a dashboard or other interior surface of a vehicle for hands-free use, in the sense that a user may use the device (e.g., via a touchscreen) without the need to manually support the device. However, the vehicle interior may be subject to significant vibrations and shocks. While vibrations, e.g., while the vehicle is idling, may make it difficult for the user to make accurate contact with a desired portion of the touchscreen. Furthermore, if the mobile device is connected to a network via a cable, port, or other physical link, the sustained vibrations and shocks may dislodge the link from its port or even damage both the link and the port.

SUMMARY

In a first aspect, embodiments of the inventive concepts disclosed herein are directed to an isolating connector module for securely connecting a ruggedized mobile communications device to a vehicle-based network. The connector module may include a USB or similar physical connector enclosed in a housing, the USB connector couplable to a corresponding USB port of the mobile device. The connector module may include a hinged panel for securing the USB connector to the USB port by attaching to an external housing of the ruggedized mobile device. The connector module may include an impact absorber having an annular shape and fashioned from a flexible material, for positioning between the connector module and the vehicle mount to isolate the connector module from shocks or vibrations conducted through the vehicle mount.

In a further aspect, embodiments of the inventive concepts disclosed herein are directed to a system including a ruggedized mobile communications device and an isolating connector module for securely connecting the mobile device to a vehicle-based network. The mobile device may have a substantially rectangular shape, with edges, corners, and a front and rear face. The mobile device may be ruggedized via a rigid housing configured to enclose and reinforce the corners of the device, the rigid housing including a support bracket for supporting the mobile device via its bottom edge and pivotably connected to a mounting plate of a vehicle mount by which the device is mounted to a vehicle dashboard. The rigid housing may be partially enclosed in a flexible housing for reinforcing the edges of the mobile device. The system may include a connector module connectable to the rigid housing and including a USB or similar physical connector connectable to a USB port of the mobile device. The connector module may include a hinged panel for securing the USB connector to the USB port by attaching to the rigid housing of the ruggedized mobile device. The connector module may include an impact absorber having an annular shape and fashioned from a flexible material, for positioning between the connector module and the vehicle mount to isolate the connector module from shocks or vibrations conducted through the vehicle mount.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Embodiments of the inventive concepts disclosed herein are directed to an apparatus for connecting a mobile device such as a tablet, smartphone, or any other similar mobile communications or computing device to a vehicle-based network and protecting the connection and its related hardware components from vehicle-related shock and vibration.

Figure 1:
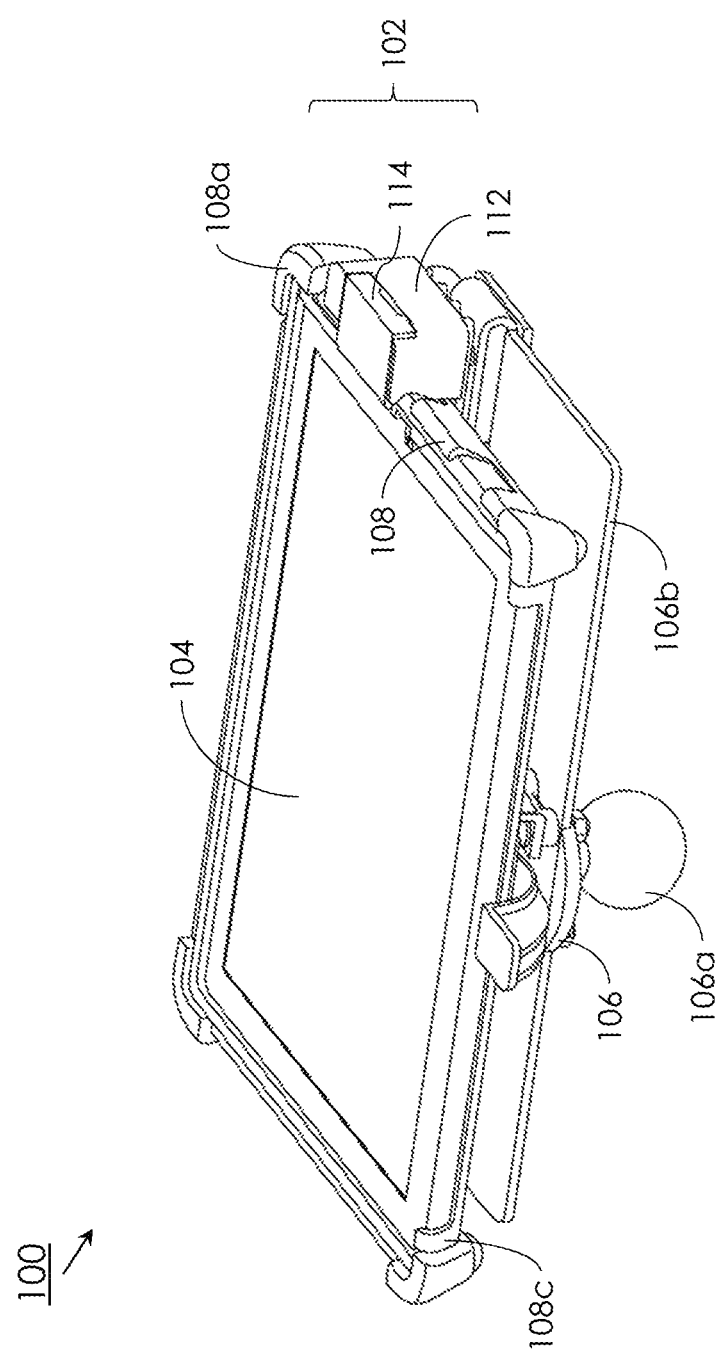
FIG. 1 is a front three-quarter view of an exemplary embodiment of an apparatus for connecting a mobile device according to embodiments of the inventive concepts disclosed herein, the apparatus in a closed state.
Figure 3:
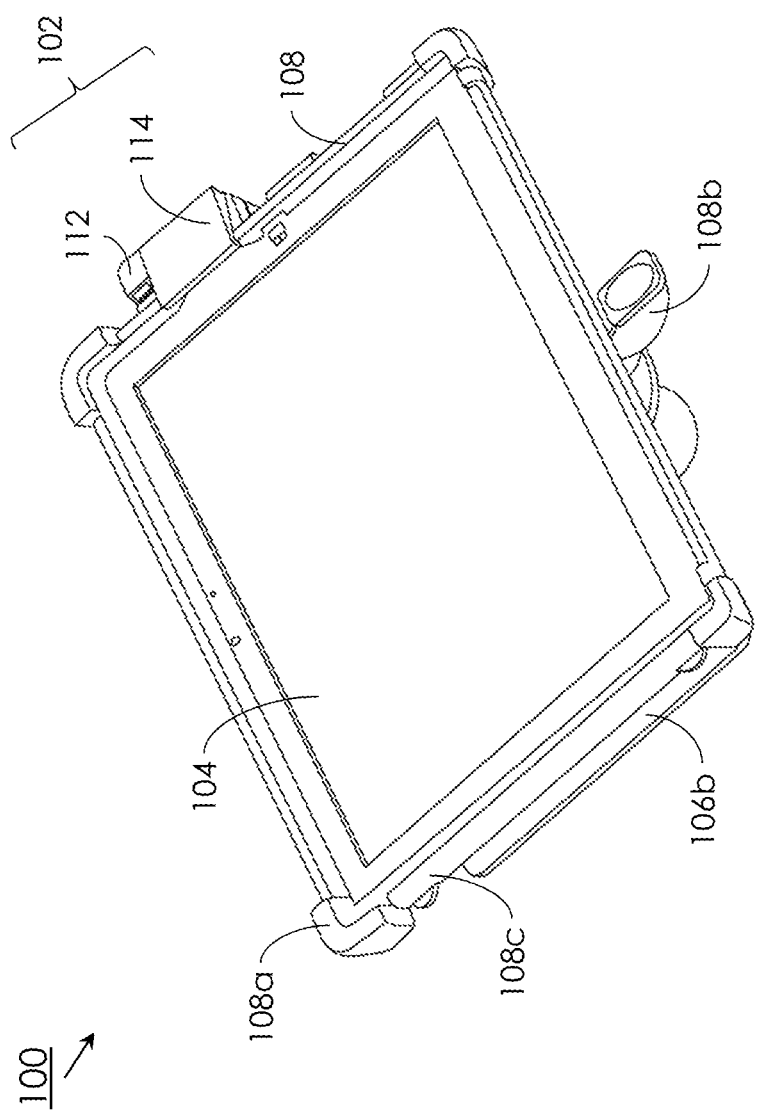
FIG. 3 is an overhead view of the apparatus of FIG. 1.

Referring to FIGS. 1 and 3, a system 100 according to the inventive concepts disclosed herein may comprise a connector module 102 couplable to a mobile device 104, such as a tablet or smartphone. The mobile device 104 may in turn be mounted to a vehicle (e.g., to a dashboard or other like interior surface of the vehicle, for use while inside the vehicle) via a vehicle mount 106. The mobile device 104 may be ruggedized for heavy-duty use; for example, the mobile device may be enclosed in a multipart protective housing to guard against impact shock or damage to the mobile device, its touchscreen, or its components and peripherals from extreme temperatures or precipitation. The protective housing (108) may include a rigid component (108a) fashioned of a high-impact plastic or similar rigid material and reinforced around the corners of the mobile device. The rigid component 108a may further include a support bracket (108b) for supporting the mobile device 104 by an edge while the mobile device is mounted to the vehicle interior (via the vehicle mount 106). The support bracket 108b may further function as a handle, by which the user may direct the system 100 toward, or away from, him/herself by articulating the system 100 (provided the vehicle mount 106 is pivotably mounted to the dashboard, e.g., via a ball mount 106a). The housing 108 may include a flexible component 108c, fashioned from a rubberized, plastic, or otherwise flexible material configured for gripping by the user. For example, the flexible component 108c may partially or fully protect the edges of the mobile device 104, partially enclosing the rigid component 108a.

The vehicle mount 106 may include a mounting plate 106b to which the support bracket 108b and rigid component 108a (or the housing 108 generally) may be attached. As the mounting plate 106b, and the vehicle mount 106 generally, may be directly connected to the dashboard (via the ball mount 106a), the shock of any impact upon the vehicle (e.g., uneven roads or potholes) as well as vibrations associated with the operation of the vehicle may be conducted by the vehicle mount to the mobile device 104. For example, the mobile device 104 may establish a wireless link to a fleet-wide network based on Bluetooth or another wireless protocol (e.g., to a stronger wireless receiver located within the vehicle); if the mobile device 104 is not itself Bluetooth-compatible, the wireless link may require an external adapter connected to the mobile device via, for example, a USB port of the mobile device 104. Alternatively, the network link may be a physical link established via the USB port. Shock and vibration may dislodge a USB-connected device from the USB port, and may even damage one or both of the USB connector and its corresponding port in the mobile device 104.

Figure 2:
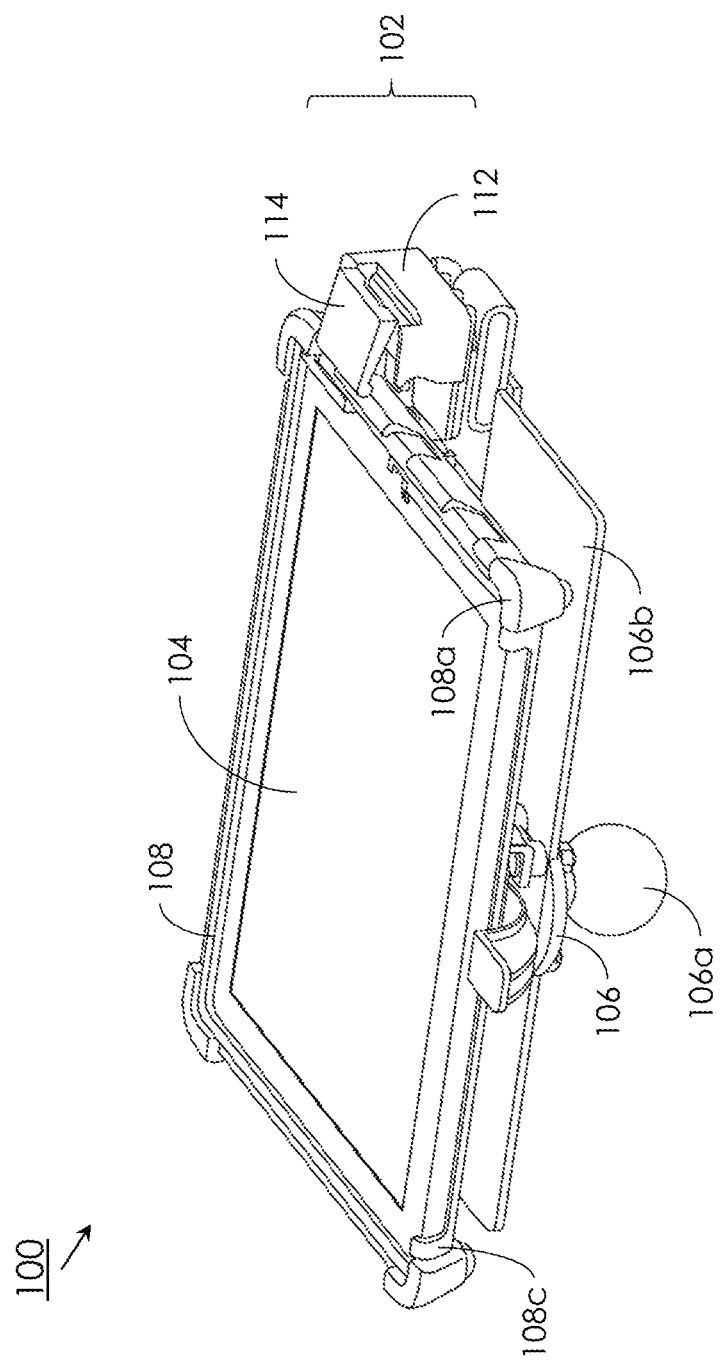
FIG. 2 is a front three-quarter view of the apparatus of FIG. 1 in an open state.
Figure 4:
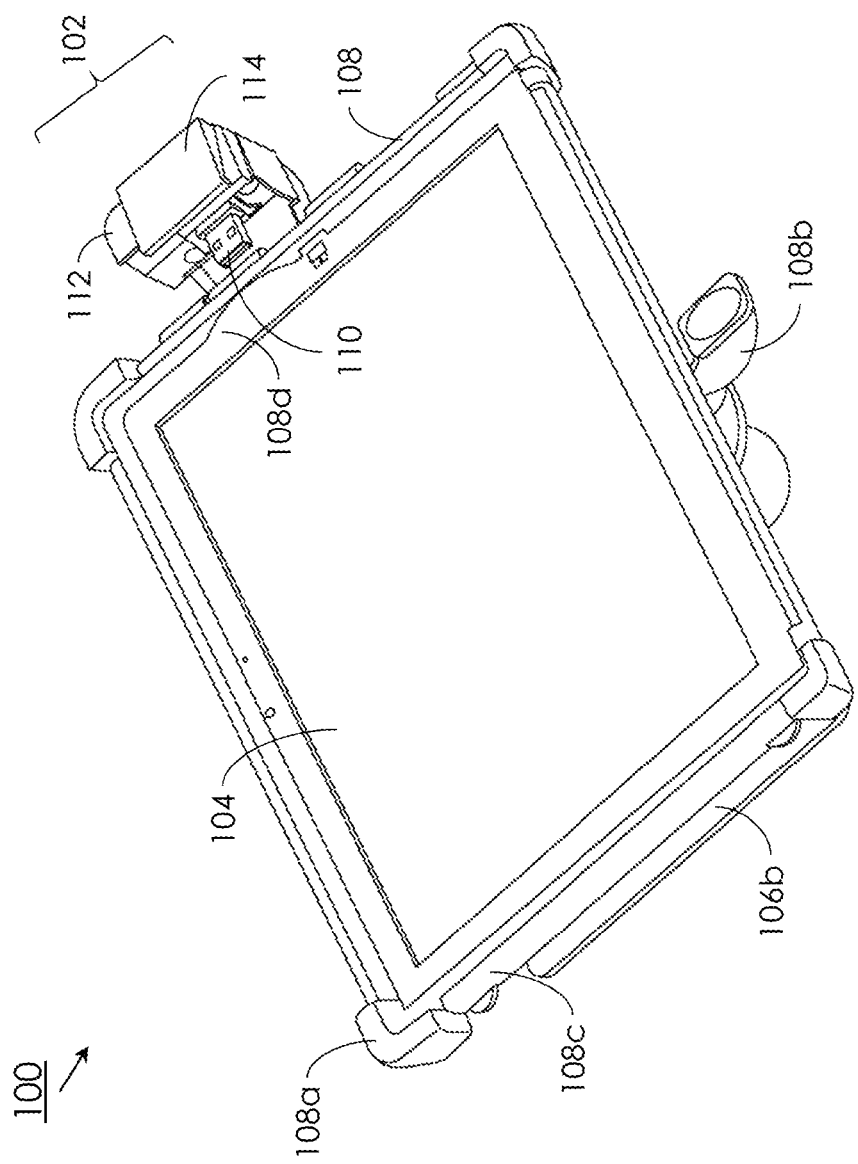
FIG. 4 is an overhead view of the apparatus of FIG. 2.

Referring also to FIGS. 2 and 4, the connector module 102 may include a USB connector (110) encased in a protective module housing 112. The module housing 112 may additionally enclose a wireless connector, such as a Bluetooth adapter, for establishing a wireless link to a mobile device 104 connected to the connector module 102 via the USB connector 110. The module housing 112 may include a protective panel (114) that serves as an access door to the USB connector 110. The protective panel 114 may be hinged so as to swing open or closed, the USB connector 110 being visible while the connector module 102 is in the open state. The USB connector 110, plugged into the corresponding USB port of the mobile device 104, may be secured in place by closing the protective panel 114. Referring particularly to FIG. 3, the protective panel may engage with the housing 108 of the mobile device 104 to hold the USB connector 110 in place; for example, the rigid component 108a may include a recess (108d) configured to accept the protective panel 114. In order to disengage the USB connector 110 from the corresponding USB port, the user must first unbuckle the protective panel 114 from the housing 108 of the mobile device 104.

Referring back to FIGS. 1 and 2, the connector module 102 may include an impact absorber 116. The impact absorber 116 may be a flexible and pliable component including multiple layers folded over themselves and positioned between the module housing 112 and the mounting plate 106b. The impact absorber 116 may be configured to isolate the connector module 102 from vibrations or shocks conducted by the mounting plate 106b by deforming in response to the vibrations or shocks. The impact absorber may have a substantially annular shape, comprising a ring or open-ended cylinder of rubber, or a synthetic rubberized material, having a Shore hardness between 40 A and 70 A. In a preferred embodiment, the impact absorber 116 is fashioned of material having a Shore hardness of 60 A.

Figure 5:
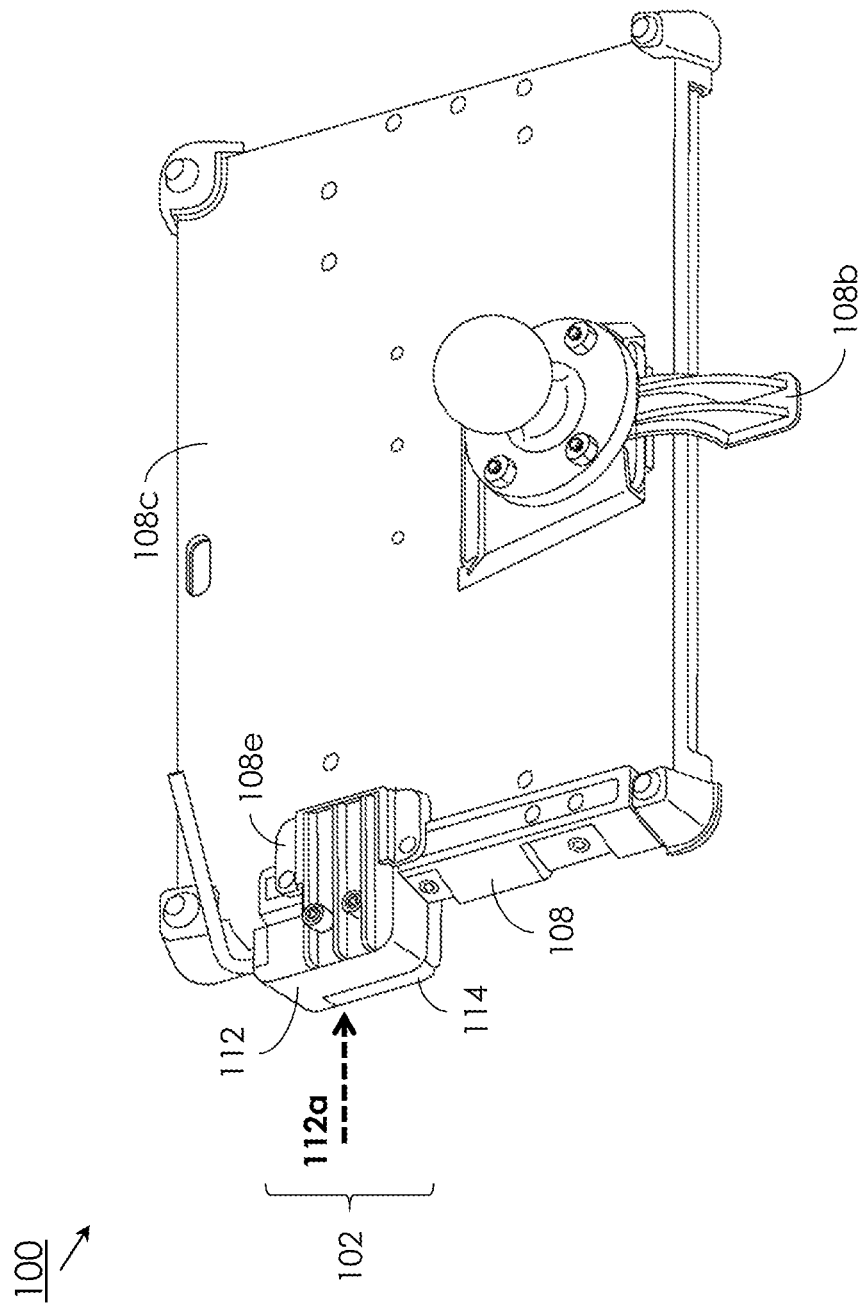
FIG. 5 is an underside view of the apparatus of FIG. 1.

Referring to FIG. 5, the connector module 102 may be removably attached to the housing 108 of the mobile device 104. For example, the rigid component 108a may include an insertion slot (108e) with which the module housing 112 may slidably engage (112a) to attach or detach the connector module 102 from the housing 108.

We claim:

1. An apparatus for connecting a mobile device, comprising:
   a physical connector enclosed in a connector housing, the physical connector couplable to a corresponding accessory port of a mobile communications device and the connector housing configured to slidably engage with a protective housing at least partially enclosing the mobile communications device;
   a protective panel hingedly coupled to the connector housing and having an open state and a closed state, the protective panel configured to secure the physical connector to the accessory port in the closed state by engaging with at least one of the mobile communications device and the protective housing; and
   at least one impact absorber coupled to the connector housing, the impact absorber fashioned of a flexible material and having an annular shape, the impact absorber configured to be positioned between the connector housing and a surface coupled to the mobile communications device and configured to isolate at least one of the physical connector and the connector housing from shock by deforming.

2. The apparatus of claim 1, wherein the at least one impact absorber is fashioned of a flexible material having a Shore hardness of no less than 40 A and no more than 70 A.

3. The apparatus of claim 2, wherein the flexible material has a Shore hardness of 60 A.

4. The apparatus of claim 1, further comprising:
   a wireless connector coupled to the physical connector, the wireless connector associated with at least one wireless protocol and configured to connect the mobile communications device to at least one network via the physical connector and the at least one wireless protocol.

5. The apparatus of claim 4, wherein the at least one wireless protocol includes Bluetooth.

6. A system for protecting a connected, ruggedized mobile device, comprising:
   a mobile communications device having one or more edges, one or more corners, a front face, and a rear face;
   a first housing configured to at least partially enclose the at least one corner, the first housing fashioned of a first material and including at least one bracket configured to support the mobile communication device by an edge of the one or more edges, the bracket removably coupled to a mounting plate, the mounting plate pivotably coupled to an interior surface of a vehicle via a ball mount;
   a second housing fashioned of a second material, the second housing configured to at least partially enclose the first housing and the one or more edges;
   at least one connector module removably coupled to the first housing, the connector module comprising:
     a physical connector enclosed in a third housing, the physical connector couplable to a corresponding accessory port of the one or more edges;
     a protective panel hingedly coupled to the third housing, the protective panel configured to secure the physical connector to the accessory port; and
     at least one impact absorber having an annular shape, the impact absorber configured to be positioned between the third housing and a surface coupled to the mobile communications device and to isolate at least one of the physical connector and the third housing from shock by deforming.

7. The system of claim 6, wherein the at least one impact absorber is fashioned of rubber having a Shore hardness between 40 A and 70 A.

8. The system of claim 7, wherein the flexible material has a Shore hardness of 60 A.

9. The system of claim 6, wherein the first material is a rigid material and the second material is a flexible material.

10. The system of claim 6, wherein the physical connector includes a USB connector and the accessory port includes a USB port.

11. The system of claim 6, wherein the connector module further comprises:
a wireless connector coupled to the physical connector, the wireless connector configured to connect the mobile device to at least one network via the physical connector.

12. The system of claim 11, wherein the wireless connector includes a Bluetooth connector.

13. The system of claim 6, wherein the connector module is configured to slidably engage with the first housing.

14. The system of claim 6, wherein the protective panel has an open state and a closed state, the protective panel configured to secure the physical connector to the accessory port by engaging with one or more of the first housing and the second housing.

* * * * *